(12) United States Patent
Persson

(10) Patent No.: US 7,289,888 B2
(45) Date of Patent: Oct. 30, 2007

(54) ACTIVE FILTER AND METHOD FOR SCHEDULING TRANSISTOR BRIDGE TRIGGER TIMES FOR EACH PHASE OF POWER GRID

(75) Inventor: Jonas Persson, Lund (SE)

(73) Assignee: Comsys AB, Lund (SE)

( * ) Notice: Subject to any disclaimer, the term of this patent is extended or adjusted under 35 U.S.C. 154(b) by 0 days.

(21) Appl. No.: 10/490,005

(22) PCT Filed: Sep. 18, 2002

(86) PCT No.: PCT/SE02/01686

§ 371 (c)(1),
(2), (4) Date: Oct. 8, 2004

(87) PCT Pub. No.: WO03/026113

PCT Pub. Date: Mar. 27, 2003

(65) Prior Publication Data

US 2005/0044298 A1   Feb. 24, 2005

(30) Foreign Application Priority Data

Sep. 18, 2001 (SE) .................................... 0103107

(51) Int. Cl.
*H02M 1/12* (2006.01)
(52) U.S. Cl. ....................... 700/296; 307/105
(58) Field of Classification Search ................ 700/296, 700/293; 713/502; 307/105
See application file for complete search history.

(56) References Cited

U.S. PATENT DOCUMENTS 5,567,994 A  10/1996  Davis et al.
5,809,340 A * 9/1998  Bertone et al. ............... 710/58

(Continued)

FOREIGN PATENT DOCUMENTS

JP    11032436    5/1999

OTHER PUBLICATIONS

"One-Cycle Control Of Switching Converters", Keyue Ma Smedley et al, Power Electronics Specialists Conference, 1991, PES '91 Record, 22nd IEEE, 1991, pp. 888-896.

*Primary Examiner*—Ryan A Jarrett
(74) *Attorney, Agent, or Firm*—Boyle Fredrickson, S.C.

(57) ABSTRACT

A method for scheduling of periodic real time processes in an operating system, comprising the steps of defining a reference point in time for a periodic real time process, and scheduling the periodic real time process from the reference point in time. Preferably a future point in time is defined as the reference point in time at the start up of the operating system. The real time process is preferably a periodic control process during which a relative control point in time, counted from the beginning of the subsequent control cycle, is calculated during each cycle with absolute time correction counted from the reference point in time. The absolute time correction corresponds to the period of the periodic process multiplied with the number of passed control periods until the beginning of the subsequent control cycle, at which the absolute control point in time is calculated through an addition of the relative control point in time with the absolute time correction. In one embodiment the method according to the invention is applied in an active filter for compensation of variations in an apparatus current consumption from a power grid as a result of changes in the apparatus' electrical load.

11 Claims, 2 Drawing Sheets

U.S. PATENT DOCUMENTS 5,977,660 A     11/1999  Mandalakas et al.
6,292,841 B1 *   9/2001  Mason et al. ............... 719/318

2005/0040219 A1 *  2/2005  Strom et al. .................. 232/11

* cited by examiner

ACTIVE FILTER AND METHOD FOR SCHEDULING TRANSISTOR BRIDGE TRIGGER TIMES FOR EACH PHASE OF POWER GRID

The present invention relates to scheduling of real time processes in operating systems for computer systems, specifically to real time processes scheduled with absolute reference time. A preferred field of application for the invention is control of active filters for suppression of disturbances and power savings in the power supply of electrical apparatus.

BACKGROUND

During scheduling of periodically executing real time processes in the operating system of a computer system, the temporal resolution is usually directly dependent of the resolution of the clock with which the process is periodically scheduled. In for example control systems exploiting real time processes with absolute reference time, an erroneously computed time results in negative consequences. Often several points in time are computed during one control cycle. Assume a control system operating with three parameters of time. During scheduling of the real time processes the following holds true:

for each control cycle, three points in time are established which shall be scheduled relative to the current cycle (relative time);
the control process, performing the calculation of the three points in time, runs periodically;
an absolute reference time is demanded;
the temporal resolution with which the process scheduled three times per control cycle is of a given size, for example 1 µs;

If the clock frequency is drifting from its intended value, which all clock's frequency does to a certain extent, the error added to the computed points in time for the three parameters of time will constantly increase. The result is that a control deadline will be missed which will cause deteoriated control performance in the best case, or machine failure in the worst case. This means that the such a process works in so called hard real time.

One purpose of the present invention is to make available a method for scheduling real time processes with absolute reference time.

SUMMARY OF THE INVENTION

The present invention relates, according to a first aspect, to a method for scheduling periodic real time processes in an operating system, comprising the steps to define a reference point in time for a periodic real time process, and to schedule the periodic real time process from said reference point in time.

Preferably a future point in time is defined as said reference point in time. In one embodiment said reference time in point is defined at the start up of the operating system, prior to the first process cycle. Preferably the first cycle of the real time process begins at said point in time.

In one embodiment said real time process is a periodic control process under which a relative control point in time, counted from the beginning of the subsequent control cycle, is calculated during each cycle. Preferably said relative point in time is recalculated to a absolute control point in time with absolute time correction from said reference point in time. In one embodiment said absolute time correction corresponds to the period of the periodic process multiplied with the amount of passed control cycles until said start of the subsequent control cycle, at which said absolute control point in time is calculated through an addition of said relative control point in time with said absolute time correction.

In one embodiment the method according to the invention is applied in an active filter compensating for variations in the current consumption from the power grid of an apparatus as a result of changes of the apparatus electrical load, which active filter for each of the power grids phases comprises a transistor bridge connected between each mentioned phase and a DC-link, whose transistor bridges are controlled by said periodic real time process. Preferably in such an embodiment, a separate control time in point is calculated for each phase during each cycle. In a variation of this embodiment further a control point in time is separately computed for the neutral line during each control cycle.

The present invention further intends to, according to a second aspect, a computer program product, for use in a computer system for processing and storage of data, for scheduling of periodic real time processes in an operating system for said computer system, comprising:
a storage medium;
means, stored on said storage medium, to define a reference point in time for a periodic real time process; and means, stored on said storage medium, to schedule the periodic real time process periodically from said reference point in time.

In one embodiment the computer program product further comprises means, stored on said storage medium, to define a future point in time as said reference point in time. Preferably the computer program product comprises further means, stored on said storage medium, to define said reference point in time during start up of the operating system, prior to the first process cycle. In one embodiment the computer program product comprises further means, stored on said data storage medium, to begin the first cycle of the real time process at said reference point in time.

In one embodiment the computer program product further comprises means, stored on said storage medium, in order to calculate a relative control point in time, counted from the beginning of the subsequent control cycle, during each control cycle. Preferably the computer program product comprises further means, stored on said storage medium, to recalculate said relative control point in time to an absolute control point in time counted from said reference point in time.

In one embodiment, where said absolute time correction corresponds to the period of the periodic process multiplied with the number of passed control periods until said beginning of the subsequent control cycle, the computer program product further comprises means, stored on said data storage medium, to calculate said absolute control point in time through an addition of said relative control time in point with said absolute time correction.

In a preferred embodiment, arranged in a control device in an active filter for compensation of variations of an apparatus current consumption from a power grid as a result of variations in the apparatus' electrical load, which active filters for each of the power grids three phases comprises a transistor bridge connected between each aforementioned phase and a DC-link, comprising said computer program product further means, stored on said storage medium, to control said transistor bridge with said periodic control process. Preferably the computer program product in the aforementioned embodiment comprises further means, stored on said storage medium, to separately calculate a control point in time for each phase during a control cycle. In one embodiment the computer program product further comprises means, stored on said storage medium, to separately calculate a control point in time for the neutral line during a control cycle.

The present invention further intends to, according to a third aspect, an active filter for compensation of variations of an apparatus current consumption from a power grid as a result of variations in the apparatus' electrical load, comprising a transistor bridge arranged for reversal of the current direction connected between each of the power grids three phases and a DC-link, further comprising a control system which partly includes means to measure load currents to said apparatus and in these identify unwished frequency components, and partly means to control current direction, strength of the current and frequency components between the phases through the DC-link in such a manner that said undesired frequency components are put out, which control system comprises means to operate with a periodic real time process according to any of the aforementioned method steps.

BRIEF DESCRIPTION OF THE DRAWINGS

A preferred embodiment is described in detail below with reference to attached figures, in which FIG. 1. schematically illustrates parts of the circuit design for an active filter in which the scheduling of real time processes according to the present invention is applied in an embodiment.

DETAILED DESCRIPTION OF A PREFERRED EMBODIMENT

Figure 1:
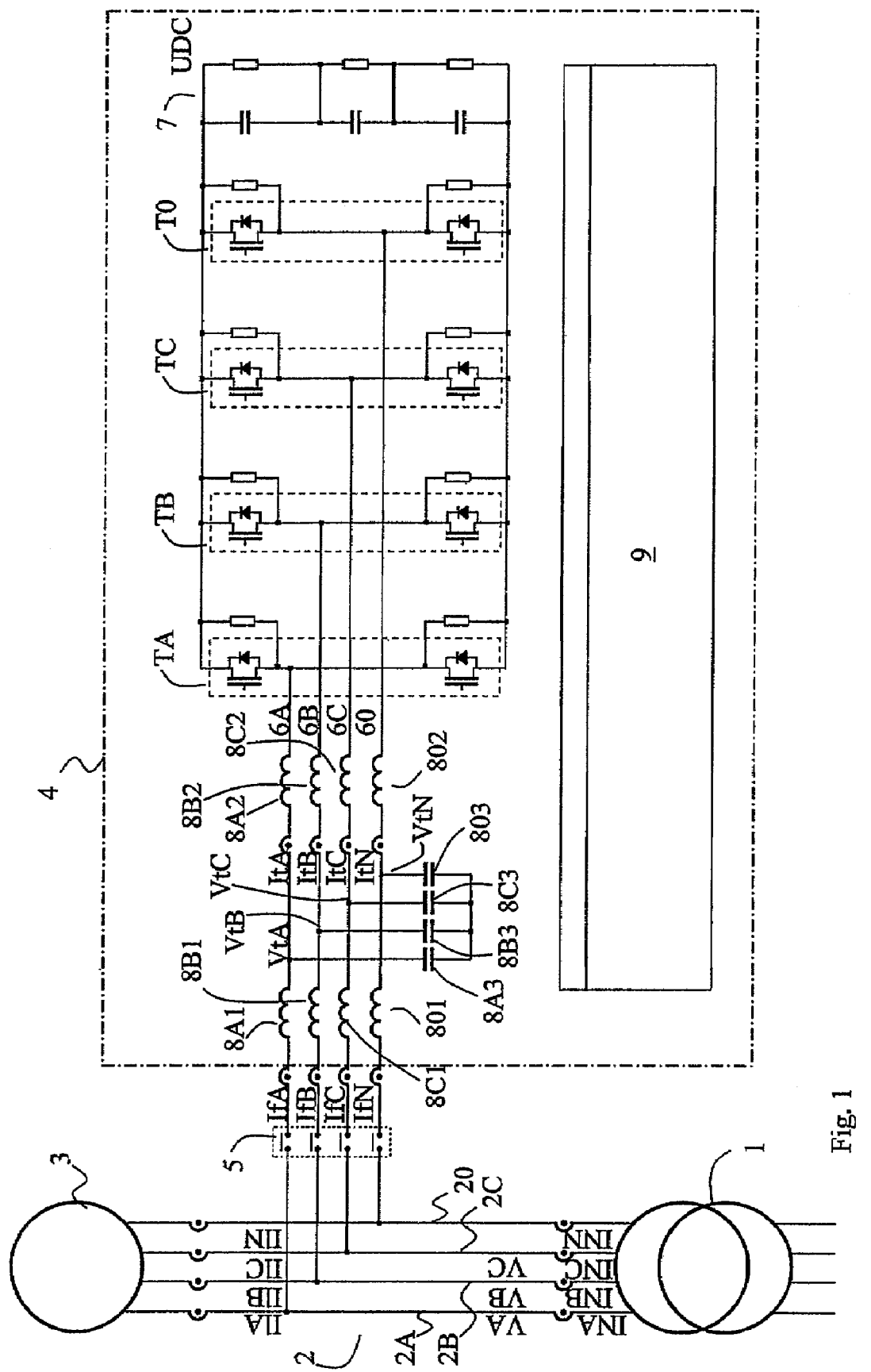

Different embodiments of the present invention can be realized in a multitude of applications where scheduling of real time processes is utilized. In order to put the invention in a specific perspective an application is presented here within active filters for compensation of variations of an apparatus current consumption from a power grid, which variations are caused by variations in the apparatus electrical load, at which active frequency filtering and dynamic compensation of reactive energy/current is applied. The skilled person will however realize that this embodiment is solely one of a multitude of possible examples. Distinctive features of the scheduling principle are presented further on with reference to FIG. 2.

A load giving the least possible losses in relation to its performed work in an electrical system is a load with purely resistive impedance. However, in most cases the impedance of the load an electrical apparatus constitutes almost always contains an inductive or capacitive component, which means that the current consumed from the feeding grid not always will be in phase with the source voltage. Furthermore, many electrical apparatus comprises active components that have a dynamically varying load, i.e. the load varies with time. Such electrical apparatus includes among others the types of apparatus converting electrical power to work, such as cranes or workshop machines. It is obvious that for example a sheet press device has an increased current consumption during active press duty than when the device is only idling. Common for this type of apparatuses is that they comprise a dynamic power supply. Furthermore, in many cases the dynamics are unpredictable, in the sense that the load changes have an uneven or indeed random periodicity, or impedance that varies in strength over time. For such processes, calculation and averaging of the current consumption can as a rule not be utilized in a satisfactory way in order to compensate the load changes. A consequence of such load behaviours is that current transients is formed in the power grid causing to a certain extent increased current consumption depending on energy content, and mainly causing problems for other sensitive equipment connected to the power grid.

In order to solve the problem with the influence of dynamic loads on the power grid so called active filters have been developed, adapted for compensating load variations. An active filter is in principle a microprocessor controlled amplifier which is connected to the power grid, and which is arranged to sense and compensate the load's current consumption in regard to frequencies which would not exist if the load was purely resistive. The active filter at that comprises a main circuit with one or a series of fast switches for each phase. Each such switch preferably comprises a transistor, a diode and a protection circuit in the form of a so-called snubber. These switches are connected to a DC-link that can accumulate electrical energy. The power grid's current provision and the load's current consumption are measured periodically and using pulse width modulation the current direction for the transistor circuits are reversed in such a manner that the current provided by the active filter results in a current drawn from the power grid that is in phase with the voltage and liberated from disturbances. Said switches generally comprise so-called IGBTs, Insulated Gate Bipolar Transistor, but can also be realized with other transistor types, for example MOSFET. Preferably the aforementioned main circuit is connected to each of the three phases of the power grids using inductors. Further, for each phase connection a circuit breaker is preferably arranged between the active filter's main circuit and the phases.

At loads varying unevenly between the phases disturbances may leak to the electrical neutral line. A problem with the thereby generated so-called null currents is that they may become non-neglectable and thereby cause problems in other equipment.

In a simultaneously filed patent application by the inventors for the present application, this is solved by an active filter for compensation of variations in an apparatus' current consumption from a power grid as a cause of changes in the apparatus' electrical load, which filter comprises a switch arranged for reversal of the current direction connected between the neutral line in the power grid and a DC-link.

Parts of a power supply device with an active filter, which are relevant to the invention, are schematically shown for a preferred embodiment in FIG. 1. A power grid 1 is connected via a power supply connection 2 to an electrical apparatus 3. The power grid 1 is a three phase system with three phases A, B, C and neutral line 0, and the power supply connection 2 has separates conductors 2A, 2B, 2C for each phase and neutral line conductor 20. Apparatus 3 comprises or constitutes preferably a load with dynamic impedance.

An active filter 4, indicated by the dotted and dashed line, comprises an electrical main circuit comprising transistor connections TA, TB, TC and T0 of pair-wise switches or transistor circuits TAU and TAD, TBU and TBD, TCU and TCD for each phase, and additionally a pair-wise switch or transistor-circuit T0U and T0D for the neutral line. Here U denotes the in the figure upper switches and D the lower switches. Each transistor circuit TAU, TAD, TBU, TBD, TCU, TCD, T0U, T0D comprises a transistor with a diode and a snubber, connected in parallel with emitter and collector on the transistor. For each phase and for the neutral line, each pair of transistor circuits have one end connected to each other, and have their opposite ends connected to corresponding opposite ends of every other one of transistor circuits TA, TB, TC, T0 and common DC-link 7. The DC-link 7 comprises in the illustrated embodiment three series connected elements of each one capacitor and one resistor which are connected in parallel. The professional skilled within the known art will however realize that the specific design of the DC-link 7 is not decisive for the invention, and that a multitude of alternative arrangements for the DC-link are well known in the art. The DC-link 7 is accordingly connected in parallel with all transistor pairs or switches TA, TB, TC, T0.

Via a conductor interface 5 with circuit breakers the active filter 4 is connectable to each conductor 2A, 2B, 2C, 20 in the power supply connection 2. For this purpose the active filter 4 is arranged with a conductor connection 6 comprising separate conductors 6A, 6B, 6C, 60 arranged in order to via conductor interface 5 connect each transistor pair TA, TB, TC, T0 to a conductor 2A, 2B, 2C, 20 at said each ends of the transistor circuits. Preferably each connection 6A, 6B, 6C, 60 is coupled to the respective conductor 2A, 2B, 2C via a T-filter comprising two serially connected inductors 8A1 and 8A2, 8B1 and 8B2, 8C1 and 8C2, 801 and 802, respectively. Capacitors 8A3, 8B3, 8C3, and 803 are commonly connected at one capacitor side, and are on the other capacitor side connected between each one pair of the serially connected inductors, as shown in FIG. 1.

A control device 9 in the active filter 4 further constitutes the filter's control system, and is arranged for control of the transistors in the filter. Said transistors are preferably constituted of IGBTs that can be activated very quickly, but can also be constituted of for example MOSFETs. The control device 9 encompasses a control computer with microprocessors in which the points in time for which the control pulses to the switches are calculated, the control pulses from which the switches are trigged. The current in the load 3, three phases and the neutral line, and the voltage in the power grid 1 is sampled into the control computer together with the DC-voltage in the link 7 and the current in the filter's three phases and neutral line. From the load currents the undesired frequency components are identified in a way well known in the art. These components, preferably represented in rotating coordinate systems, are used with reversed sign as reference value. The filter 4 then produces the same components as in the load 1 but with reversed sign, which gives measurement values. This make the load's and filter's components theoretically cancel out each other, and the compensation for the loads undesired behaviour in consumptions must no longer be supplied from the power grid but are supplied by the filter. For maintenance of the DC-link's 7 voltage there exists, integrated with other automatic control, an addition in the automatic control rules functions considering that said DC-links voltage must be maintained at a stable level in order for the filter to generate compensations currents in the different phases and the neutral line. The control system which the control device 9 realizes has as in parameters voltage VA, VB, VC on the power grids 1 conductors 2A, 2B, 2C, as well as the load currents I1A, I1B, I1C, I1N and the filter currents IfA, IfB, IfC, IfN on the phases A, B, C and the neutral line N or 0.

With help from the active filter according to the present invention there will thus not only occur compensation for load changes on the phases A, B, C but also on the neutral line 0/N. This results in a lowered or eliminated risk of neutral line current in the power grid 1, with the effect that energy losses and the risk of damage on apparatus connected to the power grid can be minimized.

Figure 2:
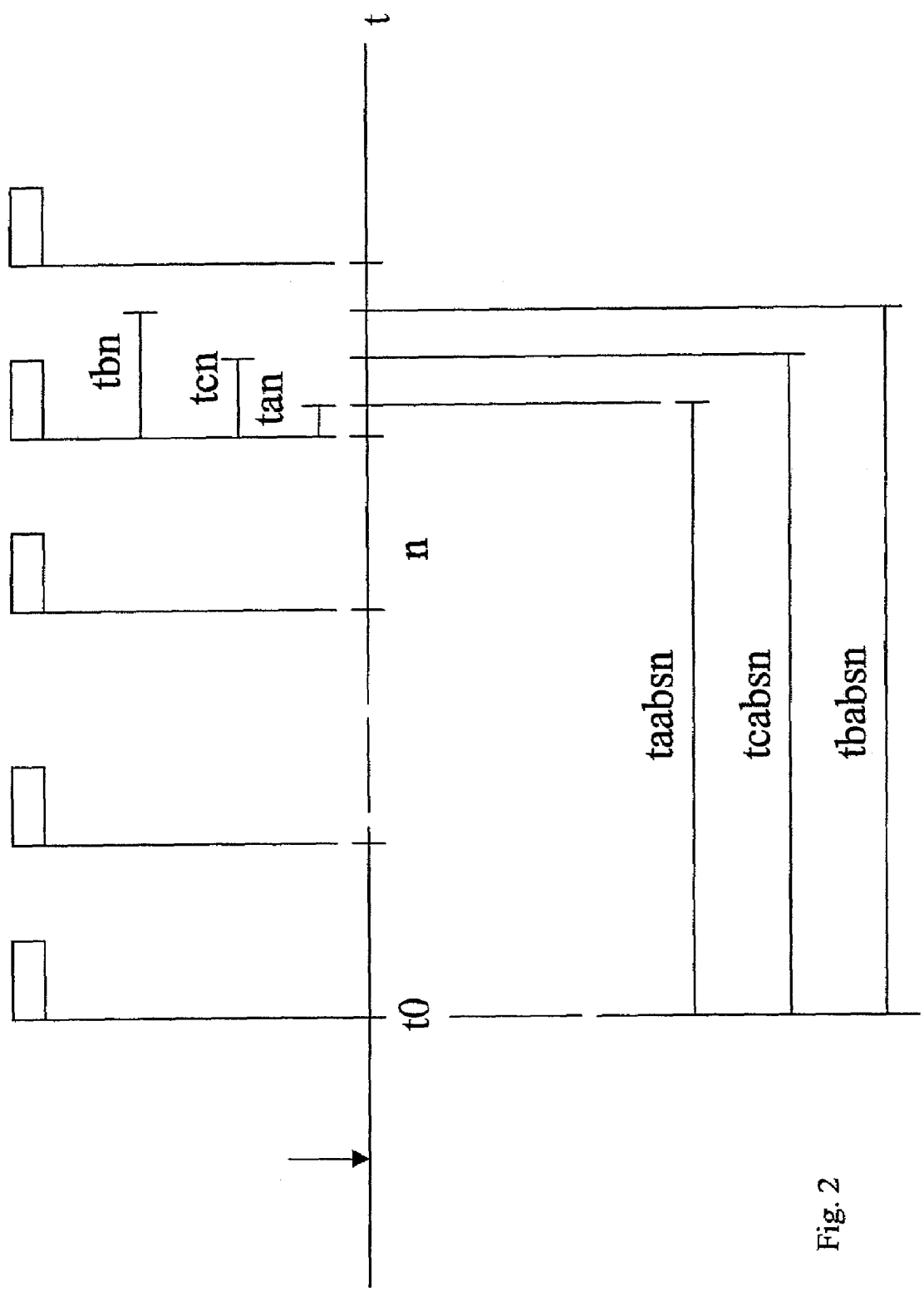
FIG. 2. schematically illustrates the scheduling according to the present invention in a time diagram.

In FIG. 2 it is shown with an example how the scheduling according to the present invention is performed. The idea is to introduce a reference point in time $t_0$ at one point in time during system start up that is considered well defined. All time calculations and scheduling of processes will then occur relative to this reference point in time $t_0$. In this way simple time calculations and good scheduling performance are accomplished. The technique can be summarized in the following steps, which refer to FIG. 2:

1. During system start up, preferably prior to the first control cycle, a start point in time, or reference point in time, $t_0$ is set when the first scheduling occurs. The start time $t_0$ is in the future, and is defined at the point in time indicated by the vertical arrow in the figure, that is to say prior to the point in time $t_0$.
2. The control process is now scheduled periodically with starting point $t_0$. Thus each starting point for the control process is given in absolute time with the period as time increment.
3. During each control cycle the control process is executing for a certain time, in the figure represented by the upper blocks starting at the beginning of each cycle. In the example with active filters the control process shall under each cycle or period n calculate three points in time for the phases a, b, c, and eventually yet another one for the neutral line 0 (not shown in the figure). All of these three or four points in time occur in the subsequent control cycle n+1. These points in time are relative next cycle's n+1 beginning and are called $t_{an}$, $t_{bn}$, $t_{cn}$.
4. The three times $t_{an}$, $t_{bn}$, $t_{cn}$ are recalculated to absolute time relative to the starting time $t_0$. The new times are called $t_{aabsn}$, $t_{babsn}$, $t_{cabsn}$
5. The process is scheduled in the real time clock after sorting of the times.

The professional skilled within the known art realizes that the points in time $t_{aabsn}$, $t_{babsn}$, $t_{cabsn}$ which are calculated later on will be used to schedule other real time processes than the real time process that performs the calculation, in the present embodiment in order to trigger the transistor bridges.

The above procedure gives quite a few advantages. The time handling in the control process becomes trivial when the control algorithm can use relative times, which is natural in accordance with the control algorithm. In all control systems there is always a clock error, but since both sampling and scheduling occurs according to the same start time ($t_0$) the effect of the time error is eliminated—when the control process is calculating relative time internally the calculation becomes exact. The practical effect is that the timing error of the hardware clock is eliminated. The system is computationally efficient, as small integers are sufficient to represent relative times. 64-bit integers are only used during conversion to absolute time, i.e., in the instant of scheduling ($t_{aabsn}$, $t_{babsn}$, $t_{cabsn}$ are 64-bit integers).

For the embodiment active filters that are operating with pulse width modulation the present invention is extremely advantageous, when one does not have to utilize programmable logic in the form of FPGA in order to avoid timing errors. Thus one gets away with less hardware than in previous systems known to the art. Preferably the control process is realized in RTLinux, or a corresponding operating system in a computer system comprising a processor with associated memory. With the present invention a method is received for scheduling of real time processes with absolute reference time utilizing only a conventional clock, without synchronization from the surrounding world. The absolute time reference demanded is absolute in the sense that the surrounding world and the control system, or in general the real time operating system, shall have the same notion of the instantaneous time.

Distinctive features for the invention above have been described with help of an example of an embodiment. The professional skilled within the known art however realizes that modifications of said embodiment can be made within the frames that are defined by the enclosed claims.

The invention claimed is:

1. A method for scheduling a process in a repetitive real time process cycle executed by an operating system in controlling an active filter having a transistor bridge for each phase of a power grid connected to a DC-link with the active filter configured to compensate for undesired variations in current consumption of an apparatus from the power grid, comprising the steps of:

(a) setting a reference point in time, To, relative to the repetitive real time process cycle using only an onboard clock with the repetitive real time process cycle having a determinate time period;

(b) determining a scheduled transistor bridge trigger time for each phase;

(c) converting each scheduled transistor bridge trigger time by applying an absolute time correction to the scheduled transistor bridge trigger time with the absolute time correction being equal to the determinate time period of the repetitive real time process cycle multiplied by the number of real time process cycles that have occurred from the reference point in time, To, up until the current real time process cycle during which the scheduled transistor bridge trigger time is set to occur; and (d) triggering a designated one of the transistor bridges when the absolute scheduled transistor bridge trigger time arrives for the designated one of the transistor bridges compensating for variation in the apparatus current consumption for the corresponding phase from the power grid.

2. The method according to claim 1, wherein the reference point in time, To, is defined at a start up of the operating system before the occurrence of a first repetitive real time process cycle.

3. The method according to claim 1, wherein each transistor bridge comprises a pair of transistors.

4. The method according to claim 3, wherein each one of the transistors comprises an IGBT or MOSFET and the DC-link comprises a capacitor.

5. The method according to claim 1, wherein the power grid further comprises a neutral line and the active filter further comprises a transistor bridge for the neutral line wherein method steps (a)-(d) are performed for the transistor bridge for the neutral line.

6. The method according to claim 1, wherein the active filter further comprises a control system that executes the operating system with the control system comprising a microprocessor and wherein the active filter operates with pulse width modulation.

7. An active filter for compensation of variations in an apparatus current consumption from a three-phase power grid as a result of variations in the electrical loads of the apparatus, the active filter comprising:

a transistor bridge arranged for reversal of the current direction connected between each of the three phases of the power grid and a DC-link; and a control system which comprises:

(a) means for measuring load currents to the apparatus and identifying undesired frequency components, (b) means for controlling current direction, current magnitude and frequency content between the phases through the DC-link in such a manner that the frequency components are extinguished, and (c) means for operating with a repetitive real time process cycle configured to (1) determine a reference point in time, To, relative to the repetitive real time process cycle having a time period, (2) determine a control point in time for each transistor bridge for each one of the three phases of the power grid for triggering the corresponding transistor bridge, (3) convert the control point in time to an absolute control point in time by applying an absolute time correction thereto that is equal to the sum of the time period of the repetitive real time process cycle multiplied by the number of real time process cycles that have occurred since the reference point in time, To, and thereafter (4) trigger each transistor bridge using the corresponding absolute control point in time determined for the corresponding transistor bridge.

8. An active filter for compensation of variations in an apparatus current consumption from a power grid as a result of variations in the electrical loads of the apparatus, the active filter comprising:

an electrical energy accumulator;

a switching arrangement comprised of a pair of transistors for each phase of electrical power from the power grid with one of the transistors for each phase linked to the electrical energy accumulator and the other one of the transistors enabling current flow to be directed in one direction opposing current flow of the corresponding phase in the opposite direction when the one of the transistors is triggered and the other one of the transistors for each phase linked to the electrical energy accumulator and the one of the transistors enabling current flow to be directed in the opposite direction opposing current flow of the corresponding phase in the one direction when the other one of the transistors is triggered;

a control device comprised of a processor configured to set a reference point in time, To, relative to a repetitive real time process cycle having a determinate time period, to determine a scheduled transistor trigger time for each phase, to convert the scheduled transistor trigger time to an absolute scheduled transistor trigger time by applying an absolute time correction to the scheduled transistor trigger time with the absolute time correction being equal to the determinate time period of the repetitive real time process cycle multiplied by the number of real time process cycles that have occurred from the reference point in time up until the present real time process cycle during which the scheduled transistor trigger time is set to occur, and triggering a designated one of the plurality of transistors when the absolute scheduled transistor trigger time arrives compensating for variation in the apparatus current consumption for the corresponding phase from the power grid.

9. The active filter according to claim 8, wherein the electrical energy accumulator comprises a DC link, and further comprising a diode and a snubber connected in parallel to each one of the pair of transistors for each power grid phase of the active filter switching arrangement.

10. An active filter for compensation of variations in an apparatus current consumption from a power grid as a result of variations in the electrical loads of the apparatus, the active filter comprising:
- a DC link;
- a transistor bridge comprised of a pair of transistors for each phase of electrical power from the power grid that are linked to each other and that are linked to the DC link;
- a plurality of inductors in series connecting each phase of the active filter to a corresponding phase of the power grid with a capacitor for each phase having one end connected to the corresponding phase between the plurality of series connected inductors for that phase and the capacitors for all of the phases having their opposite end connected to each other; and
- a control device comprised of a processor configured to carry out a repetitive real time process cycle having a determinate time period where (a) a reference point in time, To, marking the beginning of the real time process cycle is determined, (b) a scheduled transistor trigger time is determined for each transistor bridge of each phase, (c) an absolute scheduled transistor trigger time is determined for each transistor bridge of each phase by converting the corresponding scheduled transistor trigger time by adding an absolute time correction to the corresponding scheduled transistor trigger time that is equal to the determinate time period of the repetitive real time process cycle multiplied by the number of real time process cycles that have occurred from the reference point in time, To, until the current real time process cycle during which the scheduled transistor trigger time is set to occur, and thereafter (d) the transistors of each transistor bridge for each phase are triggered according to the corresponding absolute scheduled transistor trigger time compensating for variation in the apparatus current consumption for the corresponding phase.

11. A method for scheduling a process in a repetitive real time process cycle executed by an operating system in controlling an active filter comprising:
- (a) providing an active filter having a plurality of transistor bridges with a transistor bridge for each phase and a neutral of a power grid connected to a DC-link, a processor used in controlling switching of each transistor bridge, and an onboard clock;
- (b) setting a reference point in time, To, relative to the repetitive real time process cycle using the onboard clock with the repetitive real time process cycle having a time period;
- (c) scheduling a transistor bridge trigger time for each phase and the neutral;
- (d) converting the scheduled transistor bridge trigger time into an absolute scheduled transistor bridge trigger time for each corresponding transistor bridge by applying an absolute time correction to the scheduled transistor bridge trigger time with the absolute time correction being equal to the time period of the repetitive real time process cycle multiplied by the number of real time process cycles that have occurred from the reference point in time, To, up until the current real time process cycle during which the scheduled transistor bridge trigger time is set to occur; and
- (e) triggering each one of the transistor bridges when the absolute scheduled transistor bridge trigger time arrives for the corresponding transistor bridge.

* * * * *